FIG. 4

Patented Dec. 1, 1953

2,661,247

UNITED STATES PATENT OFFICE 2,661,247

BRAKE CONTROL APPARATUS

John W. Rush, Wilkinsburg, and Glenn T. McClure, McKeesport, Pa., assignors to Westinghouse Air Brake Company, a corporation of Pennsylvania Application May 27, 1949, Serial No. 95,668

8 Claims. (Cl. 303—21)

This invention relates to brake control apparatus for a railway vehicle with particular reference to apparatus controlled responsively to the occurrence of the slipping condition of a vehicle wheel due to braking for effecting a reduction in the degree of application of the brake and subsequent control of re-application or increase in the degree of the brake application in a manner to avoid sliding of the vehicle wheel.

In this application, the term "normal rotation," "normal rotative condition" and the like terms refer to a rotating condition of the vehicle wheel where the peripheral speed of the wheel coincides with the linear speed of a vehicle. The term "slip," "slipping condition," and variants refer to a rotative condition of a wheel in which the peripheral speed of the wheel differs from the linear speed of the vehicle at a given instant. The term "slide," "sliding condition" and variants thereof refer to a condition wherein a non-rotating wheel is being dragged along the road surface in a locked condition.

Various devices and apparatus have heretofore been proposed and employed in brake control systems on railway vehicles for the purpose of automatically releasing brakes on slipping wheels and reapplying the brakes in a controlled manner following the automatic brake release, all for the purpose of preventing the vehicle wheel from becoming locked and sliding. Essentially such devices and apparatus include a control valve device in the fluid pressure supply line to the brake cylinder and a wheel slip detecting device for electrically or pneumatically piloting the control valve device.

In order to control the duration of the period in which fluid under pressure is released from the brake cylinder, the control valve devices heretofore known and employed have embodied an arrangement which causes the fluid pressure in the brake cylinder to be reduced, responsively to the initiation of a wheel slip condition, to a relatively low value such as five pounds per square inch before re-supply of fluid under pressure to the brake cylinder is effected, or they have embodied a timing arrangement whereby the release of fluid under pressure from the brake cylinder responsively to the occurrence of a wheel slip condition is continued for a certain limited length of time before re-supply of fluid under pressure to the brake cylinder is effected by the control valve device.

Heretofore known control valve devices of the pneumatically piloted type have functioned satisfactorily in individual cases of wheel slip but have proven unsatisfactory due to sluggish action thereof in cases where slipping of a wheel occurs repeatedly in rapid succession, such as where re-application of the brakes to a previously slipping wheel immediately results in a recurrence of the slipping condition.

Certain heretofore known control valve devices of the pneumatically piloted type have also embodied an arrangement for insuring a reapplication of the brakes in the event of accidental breakage of the pneumatic piloting communication connecting the wheel-slip detecting device and the control valve device.

It is accordingly an object of our invention to provide an improved wheel slip control apparatus in which certain of the disadvantages of heretofore known types of apparatus are obviated.

It is another object of our invention to provide a novel type of control valve mechanism adapted to be piloted pneumatically by wheel slip detecting apparatus and which is so constructed and arranged as to operate satisfactorily and with adequate rapidity notwithstanding rapidly recurring wheel slip conditions.

Another object of our invention is to provide an improved wheel slip control apparatus having means divorced from the control valve device for effecting a time delay between the initiation of release operation and the reapplication of the brakes and having also a control valve device embodying a time delay means functioning solely for the purpose of insuring re-application of the brakes in the event of accidental breakage of the pneumatic connection between the wheel slip detector device and the control valve device.

In some types of railway cars such as high speed express or passenger cars relative high brake control pressures are employed, of the order of 110 pounds per square inch, as compared to the control pressures in the order of 70 pounds per square inch employed on cars used in freight service. It has been found that control valve devices which may operate satisfactorily in connection with the normal brake control pressures of 70 pounds per square inch in freight cars do not operate satisfactorily in connection with the higher brake control pressures of 110 pounds per square inch. We have found it desirable therefore to provide a modified form of control valve device in which the rate at which fluid under pressure is supplied to the brake cylinder is automatically controlled and varied so as to minimize the likelihood of reoccurrence of a slipping condition of a wheel incidental to a reapplication of the brakes on the wheel.

It is accordingly a further object of our invention to provide a control valve device of the type described in the foregoing objects and further characterized in having a means automatically operative to provide resupply of fluid under pressure to the brake cylinder initially at a rapid rate until such time as a pre-determined pressure is established in the brake cylinder then restricting the rate of resupply of fluid under pressure to the brake cylinder to a relatively slow rate for a limited interval of time and finally for providing a final build-up of the pressure in the brake cylinder to a maximum selected pressure at a faster rate.

The above objects and other objects of our invention, will be made apparent hereinafter, are attained by several embodiments thereof subsequently to be described and shown in the accompanying drawings, wherein.

Figure 1:
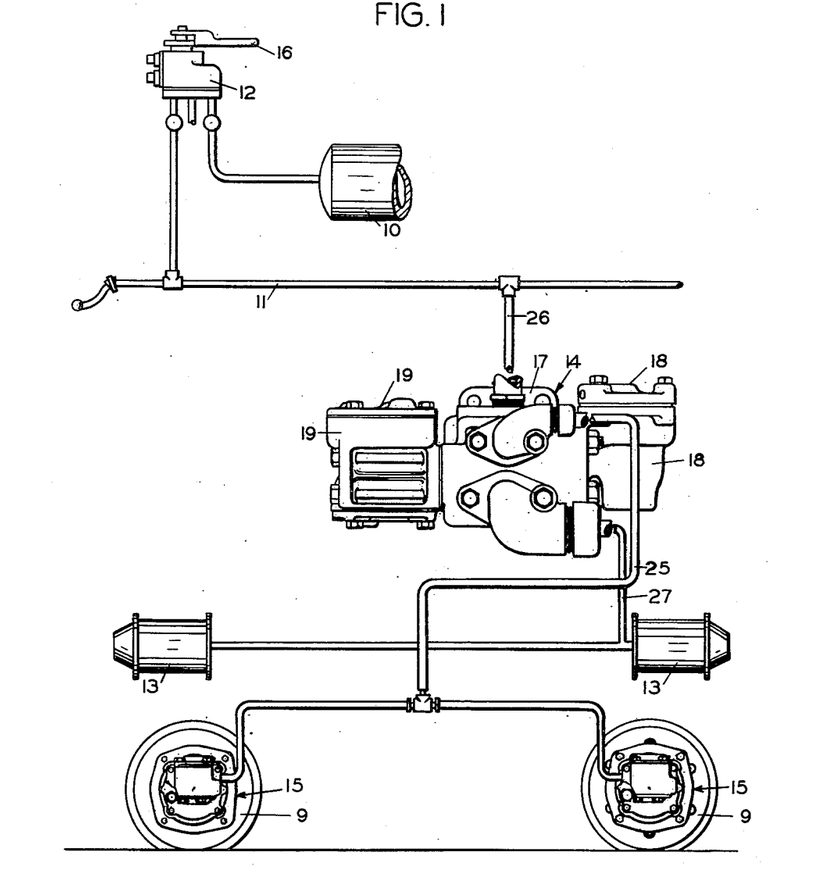
Fig. 1 is a simplified diagrammatic view of a fluid pressure brake control apparatus including an improved control valve mechanism therein.

Our invention is applicable to and is intended for use with standard fluid pressure brake equipment for railway cars. Fig. 1 illustrates, in simplified form, a straight-air type of brake equipment. The equipment shown is that for a two axle car or locomotive truck, only one wheel 9 of each pair of axle-connected wheels being shown, and comprises a fluid pressure supply reservoir 10, a straight-air pipe 11, a self-lapping brake valve 12, two brake cylinders 13 for applying the brakes on the wheels 9 of front and rear axle units respectively, a control valve 14 and two wheel slip detectors 15 each associated with a corresponding one of the two axle units shown.

The straight-air pipe 11 extends from one end of the car or locomotive to the other and in a train of cars, the straight air pipe extends from end to end of the train, being made up of sections of pipe on successive cars that are coupled by conventional hose couplings (not shown) between the locomotive and first car and between successive cars.

The self-lapping brake valve device 12 may be of the type disclosed in Patent No. 2,042,112 to Ewing K. Lynn, Jr. et al. Briefly, it comprises a self-lapping mechanism including a supply valve, an exhaust valve and a rotary shaft to which a handle 16 is secured. The self-lapping mechanism is arranged to supply fluid under pressure from the reservoir 10 to the straight-air pipe 11 when the operating handle 16 of the brake valve device is operated out of its normal release position into a brake application zone, and to release fluid under pressure from the straight-air pipe to the atmosphere when the handle 16 is returned toward the release position. The pressure of fluid established in the straight-air pipe varies substantially according to the degree of displacement of the handle 16 out of its release position. The self-lapping type brake valve has a pressure maintaining characteristic for maintaining the pressure in the straight-air pipe at a value corresponding to the handle position at all times, notwithstanding reduction of the pressure in said pipe from any reason, such as leakage.

Under normal conditions, communication is established in a manner more fully described hereinafter, through the control valve device 14 from the straight-air pipe to the brake cylinders 13 so that fluid pressure is established in said brake cylinders according to the pressure of fluid in the straight-air pipe, thus effecting application of brake forces in correspondence with the pressure of fluid in the straight-air pipe.

The control valve device 14 comprises a pipe bracket and mounting portion 17 having two substantially parallel faces on opposite sides thereof, to one of which faces a vent valve portion 18 is secured as by suitable bolts or screws, while to the other face a timing valve portion 19 is secured as by suitable bolts. Suitable sealing gaskets are provided between the abutting faces of the valve portions and the mounting bracket.

Figure 2:
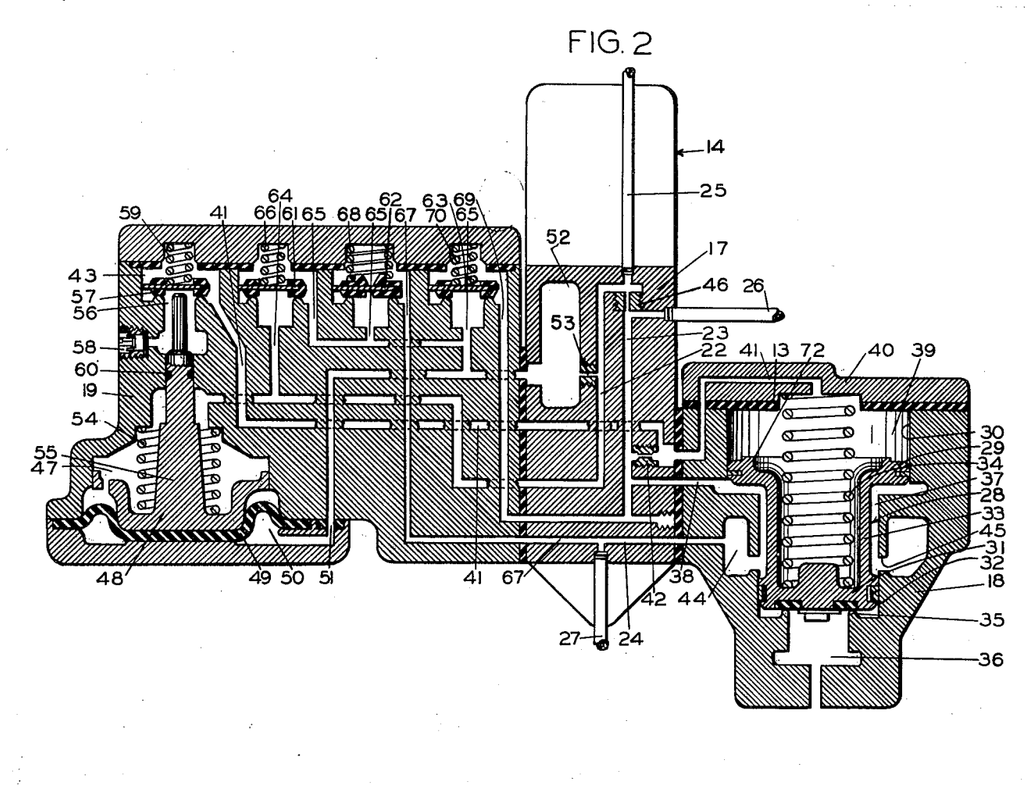
Fig. 2 is a diagrammatic sectional view of an improved control valve apparatus with parts shown in a single plane for clarity.

Referring to Fig. 2, the pipe bracket portion 17 is provided with three passages 22, 23 and 24, out of which open ports to which a pilot valve pipe 25, a straight-air pipe branch pipe 26, and a pipe 27 leading to the brake cylinders are respectively connected.

Embodied in the vent valve portion is a differential piston valve device 28 comprising an annular piston 29 operative in a cylindrical bore 30 and a disk type piston valve 31 of smaller diameter, operative in a bore 32 of corresponding diameter, the two bores being coaxially related and the piston 29 and valve 31 being connected in coaxial relationship by a tubular stem 33.

A coil spring 34 extends through the stem 33 in interposed relation between the inner face of a cover 40 and the inner face of the piston valve 31, and yieldingly urges the differential piston valve device downwardly to a position in which the piston valve 31 seats in sealing relation on a seat rib 35 surrounding a vent port 36. An annular chamber 37 is formed in surrounding relation to the stem 33, said chamber being also connected by a passage 38 to passage 23 in the mounting bracket.

A chamber 39 formed in bore 30 between the piston 29 and cover 40 is also connected to the passage 23 by a passage 41 and a suitable choke 42. Passage 41 also leads to a valve chamber 43 in the timing portion 19. Also formed in the vent valve portion is an annular chamber 44 which communicates with the annular chamber 37 through a number of spaced ports 45 in the wall of bore 32. The chamber 44 is also in communication with passage 24 in the mounting bracket to which passage the brake cylinder pipe 27 is connected.

In the mounting bracket, a screw type choke fitting 46 provides restricted communication between passage 23 and a passage 22 to which the pilot valve pipe 25 is connected, passage 22 leads to a chamber 47 at one side of a quick acting piston 48. Associated with piston 48 is a diaphragm 49 having at the side opposite chamber 47 another chamber 50. Chamber 50 is connected by a passage 51 to a timing volume 52 in the mounting bracket and through screw-threaded choke fitting 53 in a port opening out of volume 52 to passage 22. Piston 48 is biased toward chamber 50 by a spring 54 which is under an initial load between piston 48 and the casing of the timing portion. Spring 54 surrounds a piston stem 55, integral with piston 48, said stem also extending with sliding fit through a bore in the timing portion casing into an atmosphere chamber 56 where it is adapted to engage and unseat a valve 57 controlling communication between chambers 43 and 56. Chamber 56 is in communication with the atmosphere through a protected vent fitting 58. Valve 57 is urged to a normally seated position by a spring 59 in chamber 43. A sealing ring 60 is provided in a suitable annular groove in the stem 55 to provide a seal between stem 55 and the casing and thus prevent leakage from the pressure chamber 47 along stem 55 to the atmospheric chamber 56.

Also contained in the timing portion is a timing volume charging check valve 61, a limiting check valve 62 and a release check valve 63. The charging check valve 61 controls communication between a branch passage 64 of passage 22 and a branch passage 65 of passage 51 in communication with the timing volume 52. The check valve 61 is urged into a seated position on a valve seat by a spring 66 and is unseated only when fluid pressure in passages 22 and 64 exceeds the fluid pressure in passage 65 by approximately five pounds per square inch.

The limiting check valve 62 controls communication between passage 65 and passage 67 connecting with passage 24 and chamber 44. A spring 68 acts against valve 62 continuously urging the valve into a seated position on its valve seat, said valve being unseated only when fluid pressure in passage 65 and therefore in the timing volume 52 exceeds the pressure of fluid in passage 24 by approximately 25 pounds per square inch.

The release check valve 63 controls communication between passage 65 and passages 23 and 69 to release fluid pressure in the timing volume 52 when releasing the brakes. A lightly tensioned spring 70 urges valve 63 to a seated position to prevent charging volume 52 except from passage 22, as will be explained later, and to enable quick release of fluid pressure in said volume when manually releasing the brakes.

Figure 3:
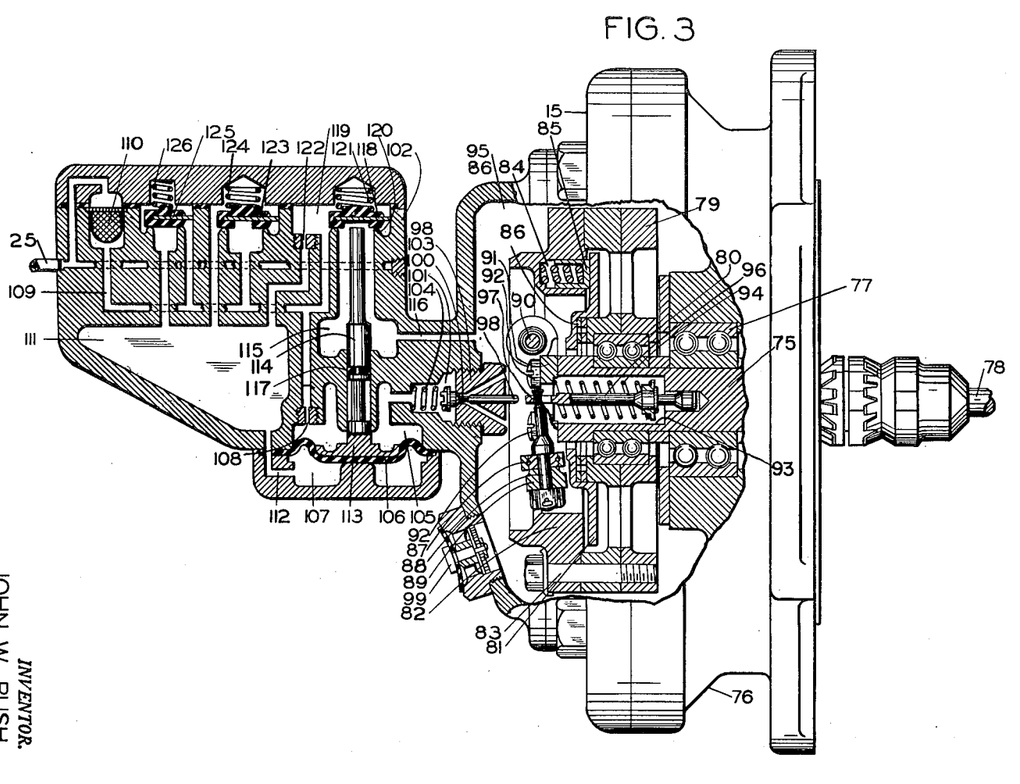
Fig. 3 is a sectional view of our improved wheel slip detector device arranged for clarity in a diagrammatic form.

The wheel slip detector device 15 is similar, in part, to the device shown in Patent 2,531,054 issued on November 11, 1950, to Cecil S. Kelley, differing therefrom in the improved pilot valve portion, hereinafter to be described, which constitutes one of the features of our present invention. Briefly, the wheel slip detector device 15 may comprise a shaft 75 journaled in a housing 76 by anti-friction bearings 77 and driven from an axle (not shown) by a suitable coupling member 78. A flywheel 79 is journaled on the shaft 75 by suitable bearings 80. The flywheel 79 is driven from shaft 75 by a mechanism including a drive plate 81 and a clutch member 82. The drive plate 81 comprises a cylindrical hub portion having an outwardly extending radial flange at one end and an inwardly extending radial flange at the other. The central portion of this plate 81 fits over the hub on the flywheel and the plate is interposed between the flywheel and the clutch member 82. The clutch member 82 is ring-shaped and is secured to the flywheel by a plurality of screws 83, only one of which is shown on the drawing. A plurality of peripherally spaced bores 84 are provided in the clutch member 82, each bore containing a recessed cylindrical clutch shoe 85 spring-biased to engage the outwardly extending flange of the drive plate 81. The force with which the clutch shoes 85 engage the drive plate is adjustable by shims 86 provided between the inwardly extending flange and outer end of the hub of the fly wheel.

It will be apparent that so long as the frictional forces between the drive plate 81 and the clutch shoes 85 are not exceeded, the flywheel and the drive plate will turn or rotate together. If, however, a force is exerted on the drive plate exceeding this frictional force, as occurs under conditions hereinafter explained, the drive plate and flywheel will rotate relative each other, subject to the braking effect of the frictional forces between the drive plate and the clutch shoes 85.

The drive plate 81 is driven from shaft 75 by a driving mechanism including a spring-weighted drive member and a suitable cam surface on the drive plate 81. The spring-weighted drive member comprises a roller 87 mounted on a bolt 88 secured midway between the extremities of a U-shaped lever 89, said lever having coaxially aligned hubs formed at its extremities and being pivotally mounted by a pin 90 journaled on a member 91 attached to the outer end of shaft 75 as by screws 92 so that the entire assemblage just described rotates as a unit. The bolt 88 extends radially past the axial center of shaft 75 at which point it is interlockingly engaged by a pin 96, said pin being slidable coaxially within the shaft 75 and biased in the right-hand direction as viewed in Fig. 3, by a spring 94 located in a bore 93 in shaft 75 and bearing at one end against a collar or flange on said pin and at the other end against member 91.

A V-shaped recess or cam is provided in an axial projection adjacent a central opening in the drive plate 81 and receives roller 87 therein. Roller 87 will climb either side of the cam recess against the force of spring 94 only when the driving force transmitted to the drive plate, in either direction of rotation exceeds a certain degree, as when wheel slip occurs as hereinafter explained. The ends of the projection having the V-shaped cam recess are arranged to engage the journal portion of the U-shaped member 89 when the roller has climbed either side of the cam recess to thus limit the rotary displacement of the drive plate 81 relative the drive shaft 75, after which the drive plate will rotate with shaft 75 relative to the flywheel 79, said flywheel being subject to the friction between it and the drive plate.

It is thus apparent that so long as the drive shaft, drive plate and flywheel are rotating with less than a certain degree of acceleration or retardation, all will rotate together. If, however, this degree of acceleration or retardation is exceeded, as when the wheels 9 attached to the axle driving the drive shaft 75 begin to slip, the drive plate will rotate with the flywheel relative to the drive shaft until the roller has climbed the cam surface and the end of the projection having the cam recess has engaged the journal portion of the U-shaped member, after which the flywheel will rotate relative to the drive plate and drive shaft until harmonious rotation is restored.

When roller 87 climbs up either of the cam surfaces, the outer end 97 of pin 96 engages the stem 98 of a pilot valve 100 and unseats said valve. The pilot valve 100 is disposed coaxial with the shaft 75 and is located in a chamber 101 formed in a casing 102, said chamber being closed by a nut 103 having a central bore through which a valve stem extends from valve 100 into close proximity with the end 97 of pin 96. A spring 104 in chamber 101 acts with one end against the casing 102 and the other end against the valve 100 tending to seat the valve at all times. Chamber 101 is open to a chamber 105 at one side of a diaphragm 106 at the opposite side of which is a chamber 107. Chamber 105 is in communication by a choke 108 with a passage 109 which is in communication with the pilot pipe 25 at all times through a strainer 110. Chamber 107 is in communication with a timing volume 111 by a passage 112.

In chamber 105 and subject to the diaphragm 106 is a diaphragm follower 113 having a stem 114 opposite the diaphragm extending through a bore in the casing 102 into a chamber 115 open to the atmosphere through a passage 116, chamber 95 and an exhaust fitting 99 designed to prevent entrance of insects, water and foreign matter. A sealing ring 117 about the stem 114 is effective to prevent leakage along stem from chamber 105, adapted to receive fluid under pressure, to the atmospheric chamber 115. Stem 114 is adapted when the follower 113 is moved in the direction of chamber 105 to engage a release valve 118 located in a chamber 119 having direct communication with the pilot pipe 25 by way of passage 109 and strainer 110. Valve 118 is normally urged to a seated position against a valve seat 120 by a spring 121. Timing volume 111 is connected by a timing choke 122 with chamber 119 to control the release of fluid under pressure in the timing volume when valve 118 is unseated, as will be explained later.

Also contained in the casing 102 is a timing volume charging check valve 123, normally seated by a light spring 124, controlling a communication from passage 109 to the timing volume 111 to allow rapid charging of the timing volume from the pilot pipe 25 and passage 109.

A limiting check valve 125 is normally seated by a spring 126 controlling another communication between the timing volume 111 and passage 109. This check valve is spring-loaded to require approximately 25 pounds per square inch to raise it from its seat. This arrangement is such that when the pilot pipe is vented by unseating of valve 118, as will be explained later, the pressure of fluid in the timing volume 111 is rapidly reduced to approximately 25 pounds per square inch to start the timing operation in which valve 118 is held open thus providing a uniform timing from various original pressures of fluid in said timing volume.

*Operation*

Referring to Figs. 1, 2 and 3, this equipment will operate as follows: with the vehicle moving normally along the right-of-way, the flywheel 79 of the slip detecting device will be rotating at a speed proportional to the vehicle speed. The spring 94 will exert sufficient load on the roller 87 that the roller will be at the base of the cams on the drive plate 81 and spring 104 is then effective to hold valve 100 seated.

A brake application may be made as desired by moving the handle 18 of the brake valve 12 into the service application zone. Fluid under pressure from the supply reservoir 10 is supplied through the brake valve to the straight-air pipe 11 establishing a pressure of fluid therein proportional to the degree of movement of the handle 10 into the service zone.

Fluid under pressure in the straight-air pipe 11 flows via pipe 26 to charge the control valve 15 (see Fig. 2) entering the control valve via passage 23. From passage 23 fluid under pressure flows through choke fitting 46 to charge the pilot pipe 25, through choke 42 and passage 41 to charge chamber 39 above the vent valve piston and valve chamber 43 in the timing portion and also to passage 38, chambers 37 and 44, passage 24 to pipe 27 and to the brake cylinder.

Fluid under pressure supplied to the pilot pipe 25 flows via passage 22 to charge chamber 47 above diaphragm 49 and past check valve 61 to charge the timing volume 52 and chamber 50 below diaphragm 49. At the wheel slip detecting device (see Fig. 3) fluid pressure from pipe 25 passes through strainer 110 to passage 109 to chamber 119 and raises check valve 123 to charge the timing volume 111 and chamber 107 below diaphragm 106. Chamber 105 above diaphragm 106 is charged with fluid pressure from passage 109 by way of choke 108.

So long as the selected degree of application of the brakes on the car wheels does not cause slipping of the wheels, the slip detecting device is ineffective to exercise any control over the brake cylinder pressure. Should wheel slip be initiated due to faulty rail surface or excessive application of the brakes with respect to vehicle load and rail surfaces, etc., then as described above, the roller 87 will ascend a cam surface on the drive plate 81 and the end 97 of pin 96 will be moved outwardly from shaft 75 to engage and unseat valve 100 of the pilot portion. As valve 100 is unseated the small volume of fluid under pressure in chamber 105 is quickly vented to atmosphere by way of the exhaust fitting 99. As fluid pressure is vented from chamber 105, fluid pressure in the timing volume 111 and in chamber 107 is effective over diaphragm 106, through follower 113 and stem 114 to unseat valve 118 to exhaust fluid under pressure in passage 109 and pipe 25 to atmosphere through port 116 and the exhaust fitting 99 at a rapid rate.

When fluid under pressure in passage 109 is thus released to atmosphere, fluid pressure in the timing volume 111 is effective under valve 125 to unseat said valve against the force of spring 126 and to reduce to atmosphere through passage 109, unseated valve 118, passage 116 and fitting 99 until the pressure of fluid in chamber 111 is reduced to approximately 25 pounds per square inch, as determined by the valve spring 126, at which time the valve 125 is seated by said spring. Due to the fact that chamber 105 above diaphragm 106 was vented to the atmosphere past valve 100, as above described, and that said chamber cannot be recharged until valve 118 is seated and passage 109 recharged, the pressure of fluid in volume 111 and chamber 107 remains effective to hold valve 118 open for such time as is required for the pressure of fluid in said volume 111 and chamber 107 to reduce to approximately 10 pounds per square inch through the timing choke 122. The total time elapsing during which valve 118 is unseated as above described is approximately two seconds during which time the pilot pipe is open to the atmosphere. The pilot pipe 25 is thus vented to atmosphere for a given interval of time each time valve 100 is unseated even though said valve may be only momentarily unseated as may occur at the time a wheel slip condition is detected.

The venting of fluid under pressure from the pilot pipe 25 as just described results in the loss of fluid pressure in passage 22 and in chamber 47 above the diaphragm 49 of the control valve device (Fig. 2). The pressure of fluid in chamber 50 and in the timing volume 52 is effective over diaphragm 49 to move follower 48 and stem 55 instantly upward to effect engagement of stem 55 with valve 57 to unseat said valve and to vent fluid pressure in passage 41 and chamber 39 above the vent valve piston device 28 to atmosphere through the vent fitting 58. Such reduction in the pressure of fluid in chamber 39 while the pressure of fluid in chamber 37 below the piston 29 remains uncharged results in the piston valve device 28 being moved upwardly against spring 34 to move valve 31 to its upper position cutting off communication between the brake cylinder supply in passage 38 and connecting the brake cylinder passage 24 to atmosphere through the vent port 36. Brake cylinder pressure is thus reduced to atmosphere and the brake forces thereby released.

As the pressure of fluid in passage 24 and thereby the pressure in passage 67 reduces to atmosphere, fluid pressure in timing volume 52 and chamber 50 is effective to raise check valve 62 and reduce to atmosphere through said passages until the pressure in said volume and chamber is reduced to 25 pounds per square inch at which time the check valve is seated by spring 68. An emergency timing period begins as fluid under pressure in the timing volume reduces below 25 pounds to the vented pilot pipe 25 so long as said pipe continues to be at atmospheric pressure as before described.

Normally after a two second period of venting of the pilot pipe 25 past the unseated valve 118, said valve is reseated as before described and the pilot pipe is recharged from the straight air pipe by way of choke fitting 46. As soon as fluid pressure is restored in the pilot pipe approximately equal to the pressure of fluid in the timing volume 52 and in chamber 50, the opposing pressures acting in chambers 47 and 50 on diaphragm 49 equalize and spring 54 thus becomes effective to move follower 48 and stem 55 to the position shown in the drawing, in which position of said stem, spring 59 is effective to seat valve 57. Upon the seating of valve 57, chamber 39 above piston valve device 24 is promptly recharged by fluid from the straight-air pipe 26 through choke 42. Fluid under pressure in chamber 39 is effective over the entire upper side of piston valve device 28 while the pressure of fluid from the straight-air pipe is effective over the under side of piston 29 and at this time the surface of valve 31 is subject to atmosphere. It will thus be seen that the piston valve device 28 promptly moves to its normal position, in which it is shown, for closing the vent port 36 and to admit fluid pressure from the straight-air pipe to the brake cylinder to effect reapplication of the brakes.

If, however, the valve 118 in the pilot portion fails to seat or if the pilot pipe 25 becomes broken, or if for any other reason the pilot pipe fails to become recharged within a predetermined period, say three seconds, after being vented, the continued reduction of fluid pressure in the timing volume 52 and in chamber 50 below diaphragm 49 enables spring 54 to become effective to move said diaphragm follower 48 and stem 55 to the position shown in which valve 57 is seated by spring 59. Fluid under pressure from the straight-air pipe 26 will then recharge chamber 39 above the piston valve device 28 and said piston valve will return to the position shown in which the brakes will be reapplied as explained above.

It will be noted from the above description that maximum speed and reliability of operation is obtained by the venting of control volumes direct to atmosphere past large capacity valves when correcting a wheel slip condition. It will be noted further, that operation of the control valve for releasing the brakes at time of wheel slip is assured by the continued venting of the pilot pipe for a period of time considered normally sufficient to allow the slipping of sliding wheel to return to normal rotation. It will still further be noted that a reapplication of the brakes is normally effected at the end of the venting period of the pilot pipe, and that if for any reason the pilot pipe fails to recharge within a certain period of time as determined by a pneumatic timing within the control valve device, reapplication of the brakes is automatically effected promptly thereafter by the control valve device.

Figure 4:
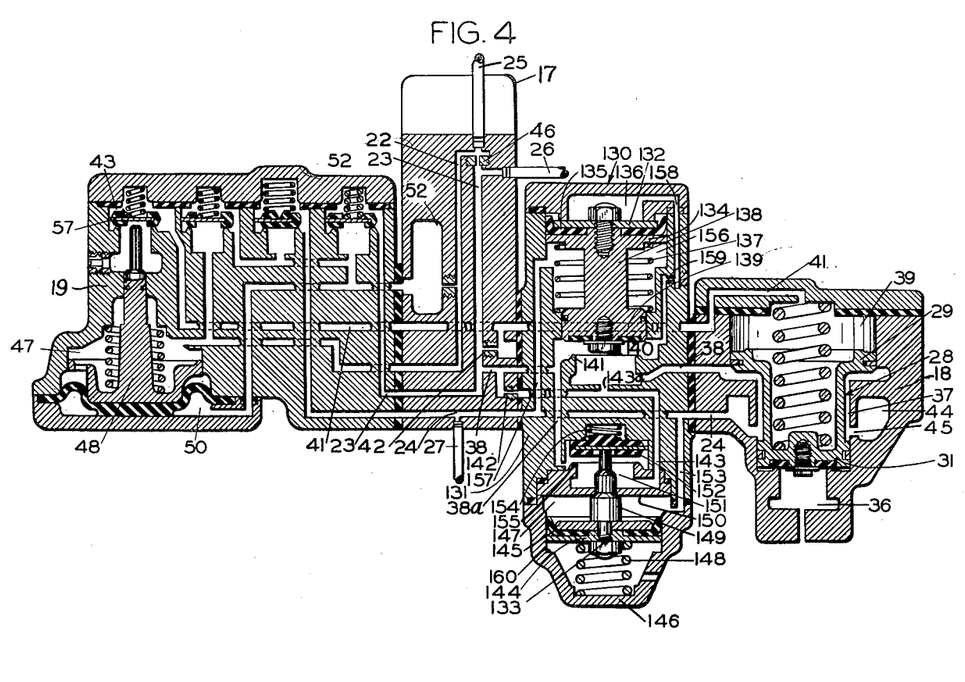
Fig. 4 is a sectional view of a modified embodiment of a control valve device suitable for controlling the resupply of fluid pressure to the brake cylinder after a wheel slip condition is corrected.

*Figure 4*

In certain classes of railway service such as fast express service the average train speed is high and in order to insure safe handling of the train, that is, to enable stopping of the train within the prescribed stop distances, a high brake control pressure is employed, this pressure being 110 pounds per square inch instead of the usual 70 pounds per square inch for a full service application. When using this high brake control pressure it is deemed necessary to control the reapplication of the brakes, after an automatic brake release resulting from a wheel slip condition, to minimize the likelihood of a reoccurrence of the wheel slip by reason of uncontrolled reapplication of the brakes. In such cases it is desirable that the reapplication of the brakes be restricted to a relatively slow rate of brake cylinder build-up after a predetermined pressure is established in the brake cylinder. Apparatus for correcting a slip condition of a vehicle wheel and providing such controlled rate of reapplication of the brakes is shown in Fig. 4.

The control valve providing the controlled rate of reapplication of the brakes comprises a reapplication control portion 130 provided between the mounting bracket 17 and the vent valve portion 18 of a control valve similar to that described in connection with Fig. 2.

The reapplication control portion 130 comprises a casing 131 having two substantially parallel faces on opposite sides thereof, one of which is adapted to be secured to the mounting bracket 17 and the other face is adapted to receive the vent valve portion 18. Embodied in the casing 131 is a cut-off piston valve device 132 and an inshot piston valve device 133. The cut-off piston valve device 132 comprises a piston 134 having a cup-shaped composition packing 135 and fitting in a suitable bore to form a movable abutment subject to the pressure of fluid in a chamber 136 at one side of the abutment and to the pressure of fluid in a chamber 156 and of a coil spring 137 at the other side thereof. Chamber 156 is connected to passage 24 by a passage 157 and chamber 136 is connected by a passage 158 and a choke 159 to passage 38. A stem 138 integral and coaxial with piston 134 extends through the spring 137 and terminates in a piston valve 139 having smaller area than the piston 134 and having a sealing and sliding engagement with a guide bore of suitable diameter. The face of the piston valve 139 is provided with a sealing gasket 140 which is adapted to be moved into sealing engagement with a valve seat rib 141 and to thereby control communication between the portion of passage 38 in the mounting bracket 19 and the portion of passage 38 in the vent valve portion 20. A choke fitting 142 in the mounting bracket 19 provides restricted communication between passage 38 in the mounting bracket 19 and a passage 143 communicating with passage 38 in the vent valve portion 20 and with the inshot valve device.

The inshot valve device comprises a piston 144 having a cup-shaped packing 145 adapted to form a movable abutment in a suitable bore of a cover plate 146, said piston being subject to fluid pressure in a chamber 147 formed at one side of said piston and to the pressure of a spring 148 located in an atmospheric chamber at the other side thereof. A stem 149 integral and coaxial with piston 144 extend through chamber 147 and a wall 150 into a chamber 151 where in one position of piston 144, said stem engages and unseats a control check valve 152. Piston 144 is normally supported in the position shown, in which valve 152 is unseated, by a control spring 148 acting between said piston and the cover plate 146. Chamber 147 above piston 144 is connected via passages 153 and 24 to the brake cylinder pipe 27 such that said piston is subject to the pressure of fluid in the brake cylinder. Spring 148 acting below piston 144 is of such value that when the pressure of fluid in the brake cylinder exceeds a selected degree say 40 pounds per square inch the piston will move against said spring to engage a shoulder 160 in the cover plate 146. In this lower position of piston 144, valve 152 is moved into a seated position on a seat rib 155 to cut off communication between passages 38a and 143 which communication is arranged to by-pass choke 142 and valve 140.

In operation, it will be assumed that wheel slip occurs upon a brake application being made, the brake valve remaining in the brake applied position. Fluid under pressure supplied to the straight-air pipe as described above enters this control valve (Fig. 4) by way of pipe 26 and passage 23 in the mounting bracket 19. From passage 23 fluid under pressure is supplied by way of choke fitting 46 to charge the pilot pipe 25 and to passage 22 for charging chamber 47 in the timing portion and the timing volume 52 in the mounting bracket and valve chamber 50 as described previously in connection with the control valve 15 shown on Fig. 2. Fluid under pressure in passage 23 also flows by way of choke fitting 42 to passage 41 to charge chamber 39 above the vent valve piston 28 and the valve chamber 43 in the timing portion 21. Fluid under pressure in passage 23 also flows by way of passage 38 past unseated valve 140 and seat rib 141 and also by way of choke fitting 142 and passage 143, port 143a, passage 38 to chamber 37, then by ports 45, chamber 44, passage 24 to the brake cylinders by pipe 27. At this same time, fluid pressure in passage 24 flows to chamber 147 by way of passage 153 so that as soon as a predetermined pressure of fluid is developed in the brake cylinders, piston 144 will move against spring 148 thus allowing spring 154 to seat valve 152 on the seat rib 155. Fluid under pressure being supplied to brake cylinders and passage 24 also flows by passage 157 to chamber 156 below piston 134 and chamber 136 above said piston is charged with fluid pressure from passage 38 through choke 159 and passage 158. These two pressures are thus normally equal so that piston 134 and valve 139 are supported in the position shown by spring 137.

Assume now that wheel slip occurs and that the wheel slip detector device operates correspondingly to vent the pilot pipe 25. Piston 48 of the timing portion 21 is operated as described above in connection with control valve 14 to unseat valve 57 and thereby to vent chamber 39 above the piston valve device 28 causing said piston valve device to move to its upper position for cutting off communication from the straight-air pipe to the brake cylinder and for venting the brake cylinder to atmosphere. As fluid under pressure is vented from passage 24 and therefore from the brake cylinders and from chamber 156 below piston 134 through the vent valve while fluid pressure is maintained in chamber 136 through choke 159 and passage 158, a differential is developed across piston 134 causing it to compress spring 137 and to move the seal 140 of valve 139 into sealing engagement with the seat rib 141 thereby cutting off communication between passage 38 in the mounting bracket and passage 38 in the vent valve portion past valve 139.

If during the application, the pressure of fluid in the brake cylinder and in chamber 147 above piston 144 exceeded the spring forces below said piston, the piston will have moved against spring 148 and come to rest against the shoulder 160 in the cover 146. As pressure is released from the brake cylinders as above described, spring 148 becomes effective to raise piston 144 and to cause stem 149 to engage and unseat valve 152 and open communication between passages 38a and 143.

As soon as the brakes have been released after a wheel slip, and the pilot pipe recharged in the usual manner the piston valve device 28 will return to its lower position as previously described in which position the brake cylinder vent port 36 is closed and communication from passage 38 to the brake cylinder is reestablished.

As described above, valve 140 is seated, choke 142 is open and valve 152 is unseated. Fluid under pressure in the straight air pipe and in passage 23 will flow by way of passage 38a, past valve 152, passage 143, port 143a, passage 38 to chamber 37, then to the brake cylinders in the usual manner until the pressure of fluid established in the brake cylinders and effective in chamber 147 over piston 144 is sufficient to overcome spring 148. Piston 144 will then move downward against shoulder 160 allowing valve 152 to seat and further flow to the brake cylinder will thus be confined to flow through choke 142, passage 143, port 143a to passage 38 and thence to the brake cylinder as previously described. This terminates the first stage of the controlled reapplication of the brakes and indicates the second stage.

The brake cylinders will continue to be recharged with fluid pressure from the straight air pipe at a rate controlled by the choke 142 until the pressure of fluid in the brake cylinders and in chamber 156 below piston 134 approaches the pressure of fluid in the straight air pipe active in chamber 136 above said piston, at which time spring 137 acting against the underside of piston 134 causes said piston to move upward, thus unseating valve 140. This concludes the second stage of the controlled reapplication of the brakes and indicates the third or final stage presently described.

As soon as valve 140 is unseated as just described, the pressure of fluid in the straight air pipe 26 and in passage 23 quickly equalizes into the brake cylinder forming the last and final stage of the controlled reapplication of the brakes following a wheel slip condition.

Should the brake application be manually released during the controlled reapplication of brake cylinder pressure, that is, while valve 140 is seated, fluid under pressure may be rapidly released from the brake cylinders to the straight air pipe past valve 152 by the brake cylinder pressure in chamber 151 under said valve raising it against the force of spring 154 and flowing via passages 38a, 38 and 23 to the straight air pipe 26. Fluid under pressure in chamber 136 above piston 134 flows back through choke 159 to the straight air pipe to permit spring 137 to move said piston to its upper position and unseat valve 140 to allow uncontrolled application of the brakes the next time an application is made.

*Summary*

It will accordingly be seen that the above described brake control apparatus includes a wheel slip detector device embodying a pneumatically timed pilot valve, which is pneumatically coupled with a brake control valve device in such manner that the occurrence of a wheel slip condition results in a positive and timed control of the brake control valve device to effect a release of the brakes effective on the slipping wheel. Operation of the brake control valve device responsive to operation of the wheel slip detector device is positive and quickly effective to initiate prompt brake release and to continue such release for a uniform period of time sufficient for the slipping wheel to be restored to normal rotative condition. Sliding of the wheels, likely to result from rapidly reoccuring wheel slip conditions, is thus prevented.

It will further be observed that the modified form of brake control apparatus disclosed functions to effect a controlled rate of reapplication of the brakes, after a wheel slip condition has been corrected, to reduce the tendency toward a reoccurrence of the wheel slip condition.

Having now described our invention, what we claim as new and desire to secure by Letters Patent, is:

1. Apparatus for controlling the application of brakes to a wheel of a vehicle comprising the combination of a valve mechanism normally in a position for establishing a first communication through which fluid under pressure may be supplied to effect application of the brakes to the wheel and operative, in response to a rapid reduction of a control fluid pressure, to a different position in which said first communication is cut off and a second communication is established through which fluid under pressure is released to effect a reduction in the degree of application of the brakes associated with said wheel only so long as said control pressure continues to be reduced, wheel slip detecting means operatively associated with and responsive to a slipping condition of said wheel to effect a rapid reduction in said control fluid pressure, timing means operatively associated with said detecting means for causing said reduction of control pressure by said detecting means to continue for a certain uniform period of time, means providing three parallel passages in said first communication, valve means normally conditioned to open one of said passages, and operatively responsive to the establishment of said second communication by said valve mechanism to close communication through said one of the passages, a valve device operatively responsive to a certain uniform pressure of fluid established in said first communication for closing a second one of said parallel passages, and means in the third one of said parallel passages for restricting the flow of fluid under pressure therethrough to a rate which is relatively slow with respect to the rate of flow through said first and second passages.

2. Apparatus for controlling the application of brakes to a wheel of a vehicle comprising the combination of a valve mechanism normally in a position for establishing a first communication through which fluid under pressure may be supplied to effect application of the brakes to the wheel and operative, in response to a rapid reduction of a control fluid pressure, to a different position in which said first communication is cut off and a second communication is established through which fluid under pressure is released to effect a reduction in the degree of application of the brakes associated with said wheel only so long as said control pressure continues to be reduced, wheel slip detecting means operatively associated with and responsive to a slipping condition of said wheel to effect a rapid reduction in said control fluid pressure, timing means operatively associated with said detecting means for causing said reduction of control pressure by said detecting means to continue for a certain uniform period of time, means providing two parallel passages through which fluid under pressure may be supplied at a rapid rate in said first communication, valve means normally conditioned to open one of said passages and operatively responsive to the establishment of said second communication by said valve mechanism to close said one of the passages, a valve device operatively responsive to a certain uniform pressure of fluid in said first communication to close the second one of said passages, and means providing for restricted flow of fluid through said first communication when both said passages are closed.

3. Apparatus for controlling the application of brakes to a wheel of a vehicle comprising the combination of a valve mechanism normally in a position for establishing a first communication through which fluid under pressure may be supplied to effect application of the brakes to the wheel and operative, in response to a rapid reduction of a control fluid pressure, to a different position in which said first communication is cut off and a second communication is established through which fluid under pressure is released to effect a reduction in the degree of application of the brakes associated with said wheel only so long as said control pressure continues to be reduced, wheel slip detecting means operatively associated with and responsive to a slipping condition of said wheel to effect a rapid reduction in said control fluid pressure, timing means operatively associated with said detecting means for causing said reduction of control pressure by said detecting means to continue for a certain uniform period of time, valve means operative upon operation of said valve mechanism to establish said second communication for limiting to a reduced rate the flow of fluid under pressure through said first communication following restoration thereof by said valve mechanism consequent upon restoration of said control pressure, and means for causing said valve mechanism to operate to reestablish the first mentioned communication to supply fluid under pressure to effect a reapplication of the brakes when said control pressure remains reduced for a certain time that is longer than the selected period of time.

4. Fluid pressure control apparatus comprising in combination, a valve mechanism normally establishing a first communication through which fluid under pressure may be supplied to a receiving device and operative in response to a reduction of a control fluid pressure to another position for closing said first communication and establishing a second communication through which fluid in the receiving device is vented, means providing a plurality of parallel passages in said first communication, a valve device operative responsively to a chosen pressure of fluid in said first communication to restrict flow of fluid through one of said passages, valve apparatus operative responsively to the establishment of said second communication to close a second one of said passages in said first communication to flow of fluid, and means for causing operation of said valve device and said valve apparatus to open said passages when fluid is released from said fluid receiving device through said first communication.

5. Fluid pressure control apparatus comprising, in combination, a valve device having a normal position in which it establishes a communication through which fluid under pressure may be supplied to a receiving device and operative out of said normal position to a different position to close said first communication and to establish a second communication through which fluid under pressure is vented from said receiving device, fluid pressure responsive means for operating said valve device subject in opposing relation to the pressure of fluid in a control chamber and the pressure of fluid in said first communication and operative in response to a reduction of pressure in said control chamber while fluid under pressure is being supplied through said first communication for operating said valve device from its said normal position to its said different position, a normally closed valve operative to an open position for venting fluid under pressure from said control chamber to atmosphere at a rapid rate, fluid pressure responsive means for operating said valve from its closed to its open position, said fluid pressure responsive means being subject on one side to a control fluid pressure and operative in response to a reduction of the pressure of said control fluid pressure for operating said valve to its open position, a pilot valve means operative to vent said control fluid pressure, and means operative upon operation of said pilot valve means to vent said control chamber for maintaining said pilot valve means in its venting position for a selected uniform interval of time.

6. Fluid pressure control apparatus comprising, in combination, a valve device having a normal position in which it establishes a communication through which fluid under pressure may be supplied to a receiving device and operative out of said normal position to a different position to close said first communication and to establish a second communication through which fluid under pressure is vented from said receiving device, fluid pressure responsive means for operating said valve device subject in opposing relation to the pressure of fluid in a control chamber and the pressure of fluid in said first communication and operative in response to a reduction of pressure in said control chamber while fluid under pressure is being supplied through said first communication for operating said valve device from its said normal position to its said different position, a normally closed valve operative to an open position for venting fluid under pressure from said control chamber to atmosphere at a rapid rate, fluid pressure responsive means adapted to be subject on one side to a control fluid pressure and on the other side to the pressure of fluid in a control volume operative in response to a reduction in said control fluid pressure to operate said valve to its open position, pilot valve means operative to effect a reduction of said control fluid pressure, means operative upon operation of said pilot valve means to vent said control chamber for maintaining said pilot valve means in its venting position for a selected uniform interval of time, and means for effecting the reduction of pressure in said control volume at such a controlled rate that said fluid pressure responsive means is caused to operate said valve to its closed position at the expiration of a certain length of time longer than the interval of time that said pilot valve means is normally maintained open.

7. Fluid pressure control apparatus comprising, in combination, a valve device having a normal position in which it establishes a communication through which fluid under pressure may be supplied to a receiving device and operative out of said normal position to a different position to close said first communication and to establish a second communication through which fluid under pressure is vented from said receiving device, fluid pressure responsive means for operating said valve device subject in opposing relation to the pressure of fluid in a control chamber and the pressure of fluid in said first communication and operative in response to a reduction of pressure in said control chamber while fluid under pressure is being supplied through said first communication for operating said valve device from its said normal position to its said different position, a normally closed valve operative to an open position for venting fluid under pressure from said control chamber to atmosphere at a rapid rate, fluid pressure responsive means adapted to be subject on one side to a control fluid pressure and on the other side to the pressure of fluid in a control volume operative in response to a reduction in said control fluid pressure to operate said valve to its open position, a piloting communication through which fluid under pressure may be vented to reduce the control fluid pressure, pilot valve means normally closing said piloting communication and operative to vent said piloting communication to atmosphere thereby to cause a reduction of the control fluid pressure, means operative upon operation of said pilot valve means to vent said piloting communication for causing said pilot valve means to remain in its venting position for a selected uniform interval of time, and means for venting fluid under pressure from said control volume into said piloting communication at such a controlled rate that said fluid pressure responsive means is caused to operate said valve to its closed position at the expiration of a certain length of time longer than the interval of time that said pilot valve is normally maintained in venting position in the event that undesired reduction of the control fluid pressure though the piloting communication continues for a time longer than the time that the pilot valve is normally maintained in venting position.

8. Apparatus for controlling the application of brakes to a wheel of a vehicle comprising, in combination, a valve mechanism normally conditioned to establish a communication through which fluid under pressure may be supplied to effect application of brakes to the wheel, and operative in response to a reduction of a control fluid pressure to a position in which said communication is cut off and another communication is established through which fluid under pressure is released to effect a reduction in the degree of application of brakes acting on the wheel so long as such reduction in control pressure is continued, wheel slip detecting means associated with said wheel and operative in response to a slipping condition of said wheel, fluid pressure responsive valve means operatively controlled by said wheel slip detecting means to effect such reduction in said control fluid pressure upon the occurrence of a slipping condition of the wheel, a timing volume charged by fluid under pressure being supplied to effect application of the brakes, a check valve device operative to effect reduction of the pressure in said timing volume rapidly to a fixed chosen pressure upon operation of said fluid pressure responsive valve means, and means for continuing the reduction in the pressure of fluid in the timing volume at a restricted rate following reduction to said chosen value, said timing volume being associated with said fluid pressure responsive valve means to maintain it in position to continue the reduction of the control fluid pressure for a substantially uniform length of time.

JOHN W. RUSH.
GLENN T. McCLURE.

References Cited in the file of this patent

UNITED STATES PATENTS

| Number | Name | Date |
|---|---|---|
| 2,198,032 | Farmer | Apr. 23, 1940 |
| 2,218,619 | McNeal | Oct. 22, 1940 |
| 2,417,211 | Newell | Mar. 11, 1947 |